United States Patent
Kim et al.

(10) Patent No.: US 8,750,788 B2
(45) Date of Patent: Jun. 10, 2014

(54) MULTIPLE DATA STREAM TRANSMISSION METHOD AND APPARATUS IN RELAY SYSTEM

(75) Inventors: Dong-In Kim, Gyeonggi-Do (KR); Wan Choi, Daejeon (KR); Jong-Yeoul Ryu, Daejeon (KR); Han-Byul Seo, Gyeonggi-Do (KR); Byoung-Hoon Kim, Gyeonggi-Do (KR)

(73) Assignees: LG Electronics Inc., Seoul (KR); Sungkyunkwan University Foundation For Corporate, Suwon (KR)

( * ) Notice: Subject to any disclaimer, the term of this patent is extended or adjusted under 35 U.S.C. 154(b) by 284 days.

(21) Appl. No.: 13/262,619

(22) PCT Filed: Apr. 2, 2010

(86) PCT No.: PCT/KR2010/002054
§ 371 (c)(1),
(2), (4) Date: Sep. 30, 2011

(87) PCT Pub. No.: WO2010/114344
PCT Pub. Date: Jul. 10, 2010

(65) Prior Publication Data
US 2012/0020279 A1  Jan. 26, 2012

Related U.S. Application Data

(60) Provisional application No. 61/166,251, filed on Apr. 3, 2009, provisional application No. 61/255,103, filed on Oct. 27, 2009, provisional application No. 61/298,203, filed on Jan. 25, 2010.

(30) Foreign Application Priority Data

Mar. 24, 2010 (KR) .......................... 10-2010-0026470
Mar. 25, 2010 (KR) .......................... 10-2010-0026979

(51) Int. Cl.
*H04B 7/14* (2006.01)

(52) U.S. Cl.
USPC ............................................................. 455/7

(58) Field of Classification Search
USPC ................... 455/7, 11.1–13.1, 15–16, 20–24; 375/211–215
See application file for complete search history.

(56) References Cited

U.S. PATENT DOCUMENTS 5,873,058 A  *  2/1999  Yajima et al. .................. 704/201
8,085,819 B2 * 12/2011  Kiran et al. .................... 370/527

(Continued)

OTHER PUBLICATIONS

Fujitsu, "Relaying with Channel Resource Reuse and SIC for LTE-Advanced," R1-090707, 3GPP TSG-RAN1 #56, Feb. 2009.

(Continued)

*Primary Examiner* — Thai Hoang
(74) *Attorney, Agent, or Firm* — Lee, Hong, Degerman, Kang & Waimey

(57) ABSTRACT

The present invention relates to a data transmission/receiving method and apparatus for overcoming interference between multiple data streams, by relaying only part of multiple data streams that are received from a source node during collaborative data transmission employing relay nodes. The multiple data stream transmission method of the present invention comprises: receiving a plurality of data streams from a source node; decoding the plurality of data streams received; selecting a portion of the successful decoded data streams; encoding the selected portion of the data streams; and sending the encoded data stream portion to a destination node.

7 Claims, 9 Drawing Sheets

(56) References Cited

U.S. PATENT DOCUMENTS

| | | | |
|---|---|---|---|
| 2005/0157806 A1* | 7/2005 | Walton et al. | 375/267 |
| 2006/0080581 A1* | 4/2006 | Ono | 714/704 |
| 2006/0239222 A1* | 10/2006 | Kim et al. | 370/328 |
| 2008/0075002 A1* | 3/2008 | Fourcand | 370/230 |
| 2008/0318520 A1* | 12/2008 | Kwun et al. | 455/7 |
| 2009/0034627 A1* | 2/2009 | Rodriguez et al. | 375/240.26 |
| 2009/0175214 A1* | 7/2009 | Sfar et al. | 370/315 |
| 2009/0268807 A1* | 10/2009 | Krishnaswamy et al. | 375/240.01 |
| 2010/0002692 A1* | 1/2010 | Bims | 370/389 |
| 2010/0178919 A1* | 7/2010 | Deepak et al. | 455/435.2 |

OTHER PUBLICATIONS

Fujitsu, "Discussion on DL coordinated multipoint transmission," R1-083115, 3GPP TSG-RAN1 #54, Aug. 2008.

* cited by examiner

| ANTENNA | BASIC DATA | SC DATA | |
|---|---|---|---|
| #1 | $x_{b,1}[(1-\alpha_1)P_1]$ | $x_{s,1}[\alpha_1 P_1]$ | $r_1 = r_{b,1} + r_{s,1}$ |
| #2 | $x_{b,2}[(1-\alpha_2)P_2]$ | $x_{s,2}[\alpha_2 P_2]$ | $r_2 = r_{b,2} + r_{s,2}$ |
| ... | ... | ... | ... |
| #M | $x_{b,M}[(1-\alpha_M)P_M]$ | $x_{s,M}[\alpha_M P_M]$ | $r_M = r_{b,M} + r_{s,M}$ |

| ANTENNA | DATA STREAM |
|---|---|
| #1 | $x_{s,1}(P_1, r_1)$ |
| ... | ... |
| #L | $x_{s,L}(P_L, r_L)$ |
| #L+1 | $x_{s,L+1}(P_{L+1}, r_{L+1})$ |
| ... | ... |
| #M | $x_{s,M-L}(P_{M-L}, r_{M-L})$ |

L SC DATA STREAMS (rows #1 to #L)

M-L BASIC DATA STREAMS (rows #L+1 to #M)

(a)

(b)

MULTIPLE DATA STREAM TRANSMISSION METHOD AND APPARATUS IN RELAY SYSTEM

CROSS-REFERENCE TO RELATED APPLICATIONS

This application is a 371 U.S. national stage application of International Application No. PCT/KR2010/002054, filed on Apr. 2, 2010, which claims priority to Korean Application Nos. 10-2010-0026979, filed on Mar. 25, 2010 and 10-2010-0026470, filed on Mar. 24, 2010, and U.S. Provisional Application Ser. Nos. 61/298,203, filed on Jan. 25, 2010, 61/255,103, filed on Oct. 27, 2009 and 61/166,251, filed on Apr. 3, 2009, the contents of which are incorporated by reference herein in their entirety.

TECHNICAL FIELD

The present disclosure relates to data transmission/reception in a relay system, and more particularly, a data transmission/reception method and apparatus for overcoming interference between multiple data streams by relaying only part of multiple data streams received from a source node during collaborative data transmission using relay nodes.

BACKGROUND ART

Service frequency ranges are getting extended in the recent communication networks and radiuses of cells are gradually decreased for supporting (covering) high-speed communication and more traffic. Thus, many problems may be caused in view of applying the conventional centralized cellular radio network as it is even later. That is, since a position of the base station is fixed, flexibility of a radio link configuration is low. As a result, it has been difficult to efficiently provide communication services in a radio (wireless) environment where there is a rapid change in traffic distribution and call demands.

To address such problems, a relay, more particularly, a multi-hop relay has been considered in the next generation wireless communication system, called as Long Term Evolution Advanced (LTE-A) system or an Evolved Universal Terrestrial Radio Access (E-UTRA) system. The relay system can broaden cell service coverage by covering a partial shadow area generated within a cell region, increase system capacity, and reduce an initial installation charge since a relay (hereinafter, referred to as 'relay station (RS)') is established in an initial stage when a service request is not frequently made.

In the relay system, a source node may transmit multiple data streams to relay nodes and a destination node using a superposition coding. Upon reception of the multiple data streams from the source node, the relay node may decode the data streams and re-encode the decoded data streams so as to perform a collaborative data transmission to the destination node. The collaborative communication method can enhance efficiency of data transmission and improve throughput of an entire network as well as compensating for resource consumption of each node.

However, interference may be caused between the multiple data streams transmitted from the source node and the relay node depending on channel environments. Under this state, the destination node may be unable to normally decode multiple data streams.

DISCLOSURE OF THE INVENTION

Therefore, to address those problems, an aspect of the detailed description is to provide a data transmission/reception method and apparatus capable of overcoming interference between multiple data streams by relaying only part of multiple data streams received from a source node during a collaborative data transmission employing relay nodes.

Another aspect of the present invention is to provide a precoding scheme for maximizing a data transmission rate in a multiple antenna (Multiple-Input and Multiple-Output, MIMO) relay system, and a multiple data stream transmission/reception method and apparatus using the same.

To achieve these and other advantages and in accordance with the purpose of the present invention, as embodied and broadly described herein, there is provided a multiple data stream transmission method in a relay system, the method including receiving a plurality of data streams from a source node, decoding the plurality of data streams received, selecting a portion of the successful decoded data streams, encoding the selected portion of the data streams, and sending the encoded data stream portion to a destination node.

Preferably, the method may further include storing the rest of data streams excluding the portion of data streams sent to the destination node from the plurality of data streams received.

Preferably, the decoding for the plurality of data streams may be configured to decode the plurality of data streams received using a Successive Interference Cancellation (SIC), sequentially starting from a data stream having the lowest data rate.

Preferably, the selecting of the portion of data streams may be configured to select upper L data streams having a high data rate by sorting out the successfully decoded data streams in the decreasing order of the data rate.

Preferably, the encoding of the selected portion of the data streams may be configured to encode the selected portion of the data streams based on a superposition coding such that a data rate of each data stream varies.

Preferably, the receiving of the plurality of data streams from the source node may be configured to receive the same together with selection information relating to the portion of data streams to be sent to the destination node.

Preferably, the decoding of the plurality of data streams may further include sending an ACK/NACK message indicating success or non-success of the decoding to the source node, and receiving selection information relating to the portion of data streams to be sent to the destination node from the source node.

Preferably, the destination node after receiving the portion of data streams may be configured to first decode the portion of data streams, and decode all the data streams received from the source node using the decoded portion of data streams based on the SIC.

To achieve these and other advantages and in accordance with the purpose of the present invention, as embodied and broadly described herein, there is provided a multiple data stream transmission apparatus in a relay system, the apparatus including a receiver to receive a plurality of data streams from a source node, a decoder to decode the plurality of data streams received by the receiver, a selector to select partial data streams from the data streams successfully decoded by the decoder, an encoder to encode the partial data streams selected by the selector, and a transmitter to transmit the encoded partial data streams to a destination node.

Preferably, the apparatus may further include a memory to store the rest of data streams excluding the partial data streams sent to the destination node from the plurality of data streams received.

Preferably, the decoder may decode the plurality of data streams received using a Successive Interference Cancellation (SIC), sequentially starting from a data stream having the lowest data rate.

Preferably, the encoder may encode the data streams based on a superposition coding such that a data rate of each data stream varies.

Preferably, the selector may select the partial data streams based on data stream selection information received from the source node.

Preferably, the selector may select upper L data streams having a high data rate by sorting out the successfully decoded data streams in the decreasing order of the data rate.

To achieve these and other advantages and in accordance with the purpose of the present invention, as embodied and broadly described herein, there is provided a multiple data stream transmission/reception method for transmitting and receiving multiple data streams containing first data and second data in a multiple antenna relay communication system, the method including receiving channel information between a source node and a relay node from the source node or relay node, obtaining channel information between the source node and a destination node and channel information between the relay node and the destination node through channel estimation, determining an optimal precoding matrix by calculating data rates of the first data and the second data based on the obtained channel information, and feedbacking components of the determined optimal precoding matrix to the source node.

Preferably, the second data may be partial data received from the relay node of the multiple data streams, and the first data may be the rest of data excluding the second data from the multiple data streams.

Preferably, the determining of the optimal precoding matrix may be configured to determine the precoding matrix for maximization of a data rate having the lowest value of the data rates of the first data and the second data.

Preferably, the method may further include receiving multiple data streams from the source node, receiving partial data streams including the second data from the relay node, and first decoding the partial data streams received from the relay node and decoding the first data using the decoded second data based on SIC.

Preferably, the first data and the second data may be transmitted after being coded based on Per Antenna Superposition Coding (PASC) for each transmit antenna.

Preferably, the first data and the second data may be transmitted after being coded based on Multi-Layer Superposition Coding (MLSC) for each transmit antenna.

To achieve these and other advantages and in accordance with the purpose of the present invention, as embodied and broadly described herein, there is provided a multiple data stream transmission/reception apparatus for transmitting and receiving multiple data streams containing first data and second data in a multiple antenna relay communication system, the apparatus including a receiver to receive channel information between a source node and a relay node from the source node or the relay node, a channel estimator to estimate channel information between the source node and a destination node and a channel state between the relay node and the destination node, a controller to determine an optimal precoding matrix by calculating data rates of the first data and the second data based upon the channel information obtained by the channel estimator, and a transmitter to feedback components of the determined optimal precoding matrix to the source node.

Preferably, the second data may be partial data received from the relay node of the multiple data streams, and the first data may be the rest of data excluding the second data from the multiple data streams.

Preferably, the controller may determine the precoding matrix for maximization of a data rate having the lowest value of the data rates of the first data and the second data.

Preferably, the receiver may receive multiple data streams from the source node during a first transmission phase and receive a part of data streams containing the second data from the relay node for a second transmission phase, and the controller may first decode the part of data streams received from the relay node and then decode the first data using the decoded part of data streams based on a Successive Interference Cancellation (SIC).

Preferably, the first data and the second data may be transmitted after being coded based on Per Antenna Superposition Coding (PASC) for each transmit antenna.

Preferably, the first data and the second data may be transmitted after being coded based on Multi-Layer Superposition Coding (MLSC) for each transmit antenna.

Advantageous Effect

In accordance with the detailed description, interference between the multiple data streams can be overcome by relaying partial information of multiple data streams received from a source node upon a collaborative data transmission using a relay node.

Also, the maximization of data rates can be achieved by transmission and reception of multimedia data streams through a precoding, which considers all the channel states between the source node and the relay node, between the relay node and a destination node and between the source node and the destination node.

MODES FOR CARRYING OUT THE PREFERRED EMBODIMENTS

Figure 1:
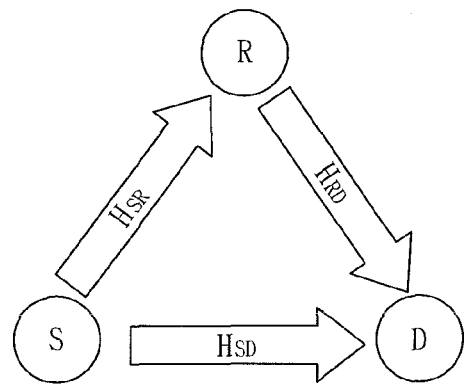
FIG. 1 is a schematic view illustrating a configuration of a relay system.

Embodiments of the present invention will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

A communication system used herein is a system for providing various communication services such as voice data, packet data and the like, and includes a base station and a terminal. Herein, Long Term Evolution Advanced (LTE-A) system or an Evolved Universal Terrestrial Radio Access (E-UTRA) system will be described as a representative example.

A source node according to the present disclosure may be a base station for a downlink data transmission, and a terminal for an uplink data transmission. Also, a destination node may be a terminal for a downlink data transmission and a base station for an uplink data transmission. A relay node may be a relay station, which receives data from the source node to transfer to the destination node.

The term 'terminal' used herein may be replaced with other terms, such as Subscriber Station (SS), User Equipment (UE), Mobile Equipment (ME), Mobile Station (MS) and the like. Also, the terminal may be a type of portable device having a communication function such as a cellular phone, PDA, a smart phone, a notebook and the like, or a non-portable device such as PC, vehicle-mounted device and the like.

The term 'base station' used herein refers to a fixed position communicating with the terminal, and be replaced with other terms, such as evolved-NodeB (eNB), Base Station (BS), Base Transceiver System (BTS), Access Point (AP) and the like. One or more cells may exist in one base station, and an interface for transmission of user traffic and control traffic may be used between base stations. Also, downlink refers to a communication channel from the base station to the terminal, and uplink refers to a communication channel from the terminal to the base station.

A relay node (RN) according to the present disclosure may be replaced with other terms, such as a relay, a Relay Station (RS) and the like, and installed between a base station and a terminal to relay transmitted and received signals, thereby serving to cover a partial shadow area generated within a cell region, broaden cell service coverage, and increase system capacity. Also, the RN may be configured as a multi-hop relay node for effectively relaying data traffic generated between the base station and the terminal. The RN may be fixed to one position or have mobility.

Multi-access schemes applied to the wireless communication system may include Code Division Multiple Access (CDMA), Time Division Multiple Access (TDMA), Frequency Division Multiple Access (FDMA), Single Carrier-FDMA (SC-FDMA), Orthogonal Frequency Division Multiple Access (OFDMA) or other known modulation schemes.

Also, multiple access schemes for the downlink transmission and the uplink transmission may differ. For example, the downlink transmission may employ an OFDMA scheme, and the uplink transmission may employ an SC-FDMA scheme.

In a relay system, a transmitting end (transmitting side, transmitter) may transmit multiple parallel data streams. A relay node may decode the received multiple data streams using Successive Interference Cancellation (SIC), and transfer part of the data streams to a destination node. After reception of the multiple data streams from the source node and the relay node, the destination ode may decode the part of the data streams received from the relay node, and thereafter use the decoded part of the data streams to decode the rest of data streams, of all the data streams sent from the source node, using SIC.

Collaborative communication using a relay node aims at enhancing stability of information transmission and broadening cell coverage with less cost and less power in case where a source-to-destination link (S-D link) state is poor. The relay node amplifies or recovers information received from the source node to transmit to the destination node. Here, in order to increase an amount of information transmitted by the relay node, a Multiple-Input Multiple-Output (MIMO) antenna is used. When information is transmitted using the MIMO antenna, multiple data streams can be transmitted at once to increase the transmission rate or provide services to multiple users at once. In view of transmission of multiple data streams, if the relay-to-destination link (R-D link) is poor or reception capability of the destination node is insufficient, transmitting all the data streams by the relay node may cause data transmission efficiency to be lowered. Also, a separate signal processing should be performed by the source node and the relay node in order to enhance transmission efficiency under the MIMO antenna environment.

FIG. 1 schematically illustrates a configuration of a relay system.

Under a basic relay communication environment, a source node S, a relay node R and a destination node D perform communications together through MIMO channels of S-R link ($H_{SR}$), S-D link ($H_{SD}$) and R-D link ($H_{RD}$), respectively. As illustrated in FIG. 1, channel matrix values indicating channel states of the respective links may be expressed by $H_{SR}$, $H_{SD}$ and $H_{RD}$, respectively.

During a first transmission phase, the source node S transmits information consisting of multiple data streams to the relay node R and the destination node D. During a second transmission phase, the relay node R forwards the information received from the source node S to the destination node D. Finally, the destination node D decodes data by combining the information received during the first transmission phase and second transmission phase.

Here, the relaying methods are typically divided into two types according to a way that the relay node R forwards the information received from the source node S to the destination node D.

(1) Amplify-and-Forward (AF) method for directly amplifying a signal received from the source node S without decoding and transmitting the amplified signal to the destination node D.

(2) Decode-and-Forward (DF) method for decoding a signal received from the source node S and re-encoding the decoded signal for signal forwarding to the destination node D.

The AF and DF relaying methods have advantages and disadvantages, respectively. AF relaying has advantages in view of easy implementation and less relay time delay and disadvantages in view of amplifying even noise components received by the relay node R. On the contrary, DF relaying has disadvantages in view of complexity in implementation and a relatively great relay time delay due to necessity of a separate decoding process in the relay node R.

When transmitting multiple information streams using a MIMO antenna in the relay system, the thusly-acquirable information amount (data rate, information rate) increases. However, when one of S-R link or R-D link is poor, an amount of information to be transmittable according to such state is limited. Therefore, in order to reduce the limit to the information amount when one of links is in the poor state, it may be preferable to variably adjust the second transmission time. That is, the second transmission phase may be shortened when the R-D link is strong (good, sufficient) while extending when the R-D link is poor, thereby reducing the limit to the information amount. However, here, multiple information streams are transmitted for the first transmission phase. Accordingly, when the R-D link is poor, the second transmission phase becomes longer and the information transmission rate (data rate) per time may rather be worse. In addition, a precoding under the related art relay communication environment has been designed according to the S-R link and the R-D link between the source and the relay without consideration of the affection of a direct link, namely, S-D link, between the source and the destination. Consequently, there is a problem of being unable to effectively use information received by the destination node D via the S-D link for the first transmission phase.

Therefore, a precoding considering even the S-D link should be concerned for better use of information that the destination node D has received via the S-D link for the first transmission time.

This specification proposes a variable transmission phase scheme capable of variably determining the second transmission time for improvement of information transmission efficiency, in order to minimize or prevent reduction of information transmission rate of a system when the relay node R retransmits all the data streams received from the source node S in the related art DF relaying. Here, this specification proposes a method for transmitting only part of information by the relay node in consideration of an environment in which both the relay node R and the destination node D can use Successive Interference Cancellation (SIC).

The source node S may divide information to be transmitted into information that the relay node R is to forward to the destination mode D and information that the relay node R is not to forward to the destination node, and encode such information. Here, the source node S may encode the two types of information for each transmit antenna based on a superposition coding, or divide the information into forwarding streams by the relay node R or non-forwarding streams. When such two types of information are received, the relay node R and the destination node D decode one type of information with interference, and receive another type of information without interference by removing the decoded information from the existing signal using SIC.

Figure 2:
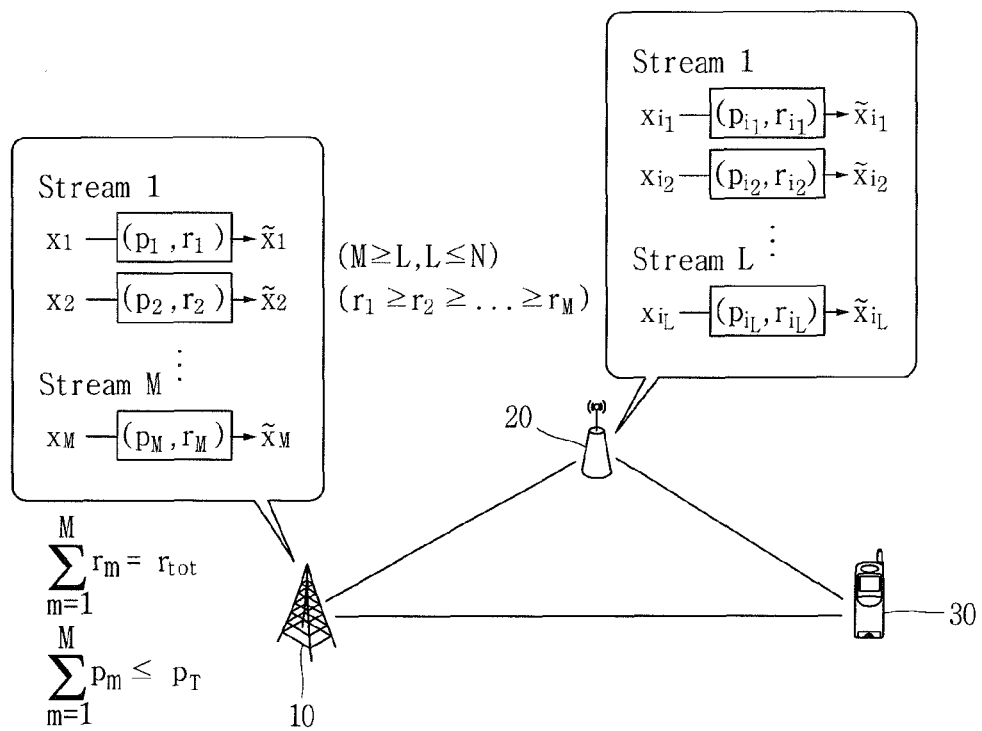
FIG. 2 is a view illustrating a data stream transmission process through a variable rate superposition coding in a relay system in accordance with one exemplary embodiment.

FIG. 2 illustrates a data stream transmission process using Variable Rate Superposition Coding (VRSC) in a relay system in accordance with one exemplary embodiment.

A source node 10 may allocate M data streams with specific transmission rate r and power p, respectively, and transmit the M data streams to a relay node 20 and a destination node 30 based on a superposition coding.

Upon receiving the M data streams transmitted from the source node 10, the relay node 20 may decode the received M data streams. The relay node 20 may allocate L data streams of the M data streams with specific transmission rate $r_i$ and power $p_i$, and forward the L data streams to the destination node 30 based on the superposition coding.

The destination node 30 may first decode the L data streams forwarded from the relay node 20. The destination node 30 may then decode the rest of data streams, of the M data streams, which have been transmitted from the source node 10, using the successfully decoded L data streams based on SIC, thereby completing decoding of the entire data streams.

That is, the source node 10 and the relay node 20 may execute a Variable Rate Superposition Coding (VRSC) with respect to the M data streams and the L data streams, respectively, to transmit to the destination node 30. The destination node 30 may first decode the L data streams forwarded from the relay node 20 and completely decode the rest of data streams using the decoded L data streams. As such, the relay node 20 may forward only part of data streams, other than all the data streams, transmitted from the source node 10, to the destination node 30, so as to reduce interference between multiple data streams. Also, the destination node 30 can efficiently decode the M data streams using SIC.

Preferably, the VRSC scheme classifies entire transmit antennas $n_s$ into several subgroups $n_{si}$, so it may be applicable to a data stream transmission via multiple transmit antennas. For example, if it is assumed that average channel gain information is used, an optimal transmission rate and power allocation for VRSC is first performed for each antenna group, and accordingly the VRSC is performed, thereby transmitting a plurality of data streams.

Upon receiving multiplexed data streams, which have been transmitted from the source node 10 after encoded based on the VRSC, the relay node 20 forwards the data streams to the destination node 30 using a Successive Decode and Forward (SuDF) protocol. The SuDF refers to segmenting multiple parallel data streams into a plurality of sub-parallel data streams based on a successive decoding, encoding the data streams based on a superposition coding and transmitting the data streams.

The relay node 20 sorts out the successfully decoded data streams in the decreasing order of the data rate, preferably, and creates part of data streams in the decreasing order of the data rate as a subgroup so as to forward to the destination node 30. Also, upon occurrence of a data transmission error between the source node 10 and the destination node 30, data retransmission such as H-ARQ may be performed from the relay node 20 to the destination node 30. Hence, data streams having a relatively low data rate may be stored in a buffer of the relay node 20 to be utilized for data retransmission later.

According to the aforementioned methods, interference between collaborative data streams transmitted from the relay node 20 to the destination node 30 can be reduced, accordingly, such collaborative data streams can be decoded in the destination node 30 more successfully.

Figure 3:
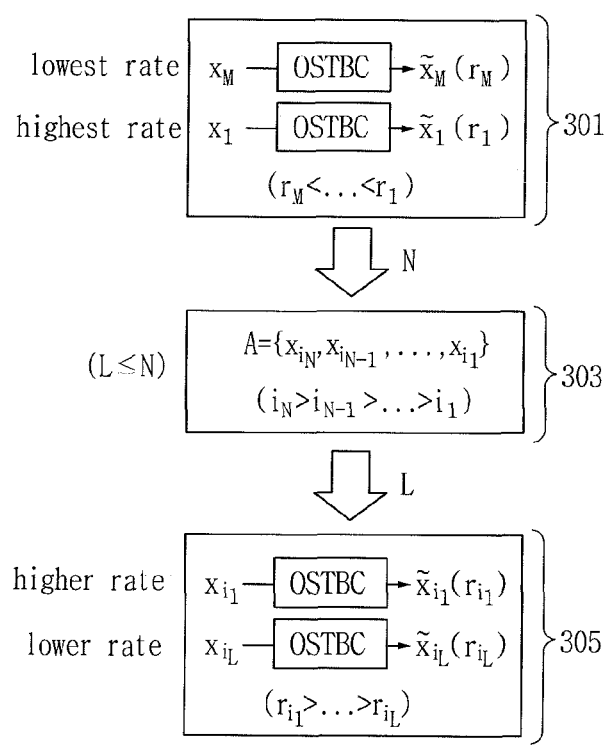
FIG. 3 is a view illustrating a Variable Rate Superposition Coding (VRSC) and SuDF process when an Orthogonal Space-Time Block Code (OSTBC) is employed.

FIG. 3 illustrates a VRSC and SuDF process when an Orthogonal Space-Time Block Code (OSTBC) is employed.

As illustrated in FIG. 3, M data streams are transmitted by being superposition-coded into M parallel data streams 301 using OSTBC with each data rate r variable. When the relay node attempted to perform data decoding after receiving the M parallel data streams 301, if it is assumed that N out of the M parallel data streams have been successfully decoded, the relay node selects L data streams from the successfully decoded N data streams 303 and encodes the L data streams into the L parallel sub data streams 305 based on the superposition coding using the OSTBC, with each data transmission rate $r_i$ variable, thus to forward to the destination node.

Figures 4, 5:
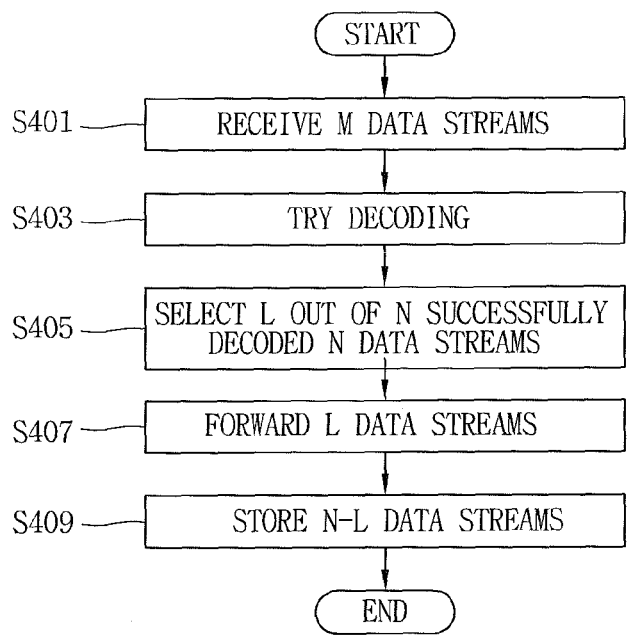
FIG. 4 is a flowchart illustrating sequential steps of a signal processing process through a SuDF relay protocol in a relay node.
FIG. 5 is a view illustrating a method for transmitting multiple data streams using a superposition coding for each transmit antenna.

FIG. 4 is a flowchart showing sequential steps of a signal processing through a SuDF relay protocol at the relay node.

The relay node may receive a packet containing M data streams from the source node in a listening phase (S401).

In the listening phase, the relay node may try to sequentially decode the M data streams, based on the SIC, starting from the $M^{th}$ data stream at the lowest data rate ($r_M$) of the received M data streams (S403). Here, the destination node may also receive the data streams sent by the source node in the listening phase and keep the received signal for the possible use in the data recovery later. Preferably, the relay node and the destination node may feedback the decoding result for each data stream sent by the source node by sending ACK/NACK message.

At the step S403, assuming that N out of the total M data streams have been successfully decoded, if a set of decodable data is A, A may be defined as shown in Formula 1 as follows.

$$A=\{X_{iN}, X_{iN-1}, \ldots X_{i1}\} \text{ with } N=|A| \leq M \quad \text{Formula 1}$$

Afterwards, the relay node may select a set of L data streams from the decodable N data streams in the data set A (S405).

Assuming that the predetermined data set selected at the relay node is referred to as a collaborative (cooperative, cooperating) subset B, B may be defined by Formula 2.

$$\{B=X_{i1}, X_{i2}, \ldots X_{iL}\} \subset A \text{ with } L=|B| \leq N \quad \text{Formula 2}$$

Preferably, the relay node may sort out the decodable N data streams in the decreasing order of the data rate, starting from the highest data rate, and select a set of L data streams with the highest data rate.

The set of L data streams may preferably be determined as a set of data streams which can be more successfully decoded by the destination node when transmitted from the relay node to the destination node and allow all the M data streams sent from the source node to be very likely recovered, based on the SIC.

Afterwards, the relay node may map a plurality of data streams $X_{ij}$ (j=1, 2, . . . , L) into transmit antennas $n_{R,ij}$ ($n_R = n_{R,i1} + n_{R,i2} + \ldots + n_{R,iL}$), respectively, and deliver corresponding symbol $\tilde{x}_{ij}$ to the destination node in a collaborative phase (collaborative transmission phase) (S407).

The source node may participate in the collaborative transmission of this collaborative phase of the relay node by transmitting the signal of all or part of the L data streams to the destination node. Also, the source node or relay node may inform the destination node of the data streams transmitted in the collaborative phase by a higher-layer signaling or a control channel. If the data stream set A which is decodable in the relay node is empty, the relay node may not perform the collaborative transmission since there is no highly reliable data stream available for transmission in the collaborative phase.

Also, the rest of N-L data streams excluding the data streams delivered through the collaborative transmission may be stored in a buffer of the relay node for later data retransmission, for example, H-ARQ (S409).

The destination node may receive the M data streams from the source node in the listening phase and receive the L data streams from the relay node in the collaborative phase. Afterwards, the destination node may decode the L data streams forwarded from the relay node in the collaborative phase. The destination node may then subtract the decoded L data streams from all the signal components (M data streams) received from the source node in the listening phase and decode the remaining M-L data streams.

The partial information relaying scheme of the relay node may preferably be designed by considering an asymmetric cellular environment having relatively good channel states for a relay link between the source node and the relay node and an access link between the relay node and the destination node, as compared to a direct link between the source node and the destination node. Also, regarding time division half duplexing where data transmissions of the relay node and the source node are discriminated on a time basis, the source node transmits M data streams containing basic data streams and Successive Cancellation (SC) data streams in the first hop, and the relay node transmits only L SC data streams in the second hop. The destination node may decode the L SC data streams received in the second hop, and decode the basic data streams by subtracting the SC data streams from the signal of all the data streams received in the first hop.

Preferably, an approach to improve system performance may be a data relaying through an adaptive TDM, in which the transmission phase of the second hop is designed shorter than that of the first hop such that only partial information containing the SC data streams received from the relay node can be forwarded to the destination node via the access link (i.e., a link channel between the relay node and the destination node) having a relatively good channel state. The adaptive TDM scheme may allow only the partial information of the SC data streams to be forwarded to the destination node more rapidly, which may result in an increase in an overall rate capacity and reduction of information loss due to the half duplexing of the relay system.

FIG. 5 illustrates a method for transmitting multiple data streams using a superposition coding for each transmit antenna.

As illustrated in FIG. 5, basic data and SC data may be configured such that data streams or data layers are serially formed for each antenna, and power $P_M$ allocated for each antenna may be distributed to two data streams or layers based on a power division factor $\alpha_m$, m=1, 2, . . . , M). Here, the power distributed to the two data streams or layers may be determined by considering asymmetric channel links.

Figure 6:
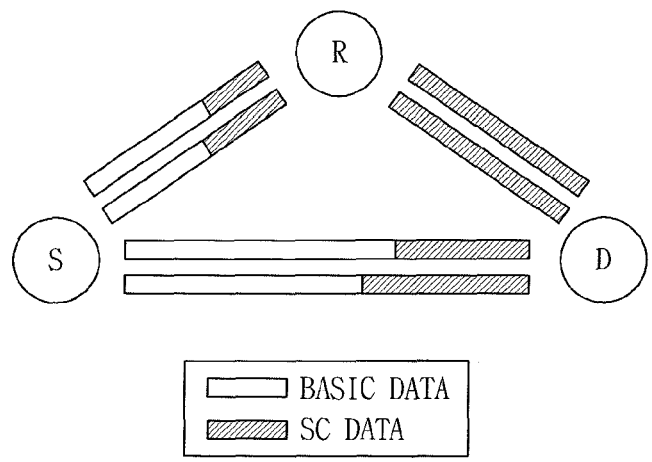
FIG. 6 is a view illustrating a partial information relaying method using a Per antenna Superposition Coding (PASC).

FIG. 6 illustrates a partial information relaying method using Per Antenna Superposition Coding (PASC).

Upon transmission of multiple data streams using the PASC, the power division factor $\alpha_m$ should be optimized for maximization of an overall rate capacity. Preferably, the optimization of the power division factor $\alpha_m$ may be determined based on per-antenna Signal to Interference Noise Ratio (SINR) after a proper decorrelation process, such as MMSE-SIC algorithm, for minimization of the interference between data streams by considering the asymmetric channel conditions between the direct link and the relay link.

As illustrated in FIG. 6, among the multiple data streams sent from the source node to the relay node, the SC data streams may be allocated with relatively higher transmission power than the basic data streams so as to increase possible reception/decoding of the SC data streams of the relay node.

Figure 7:
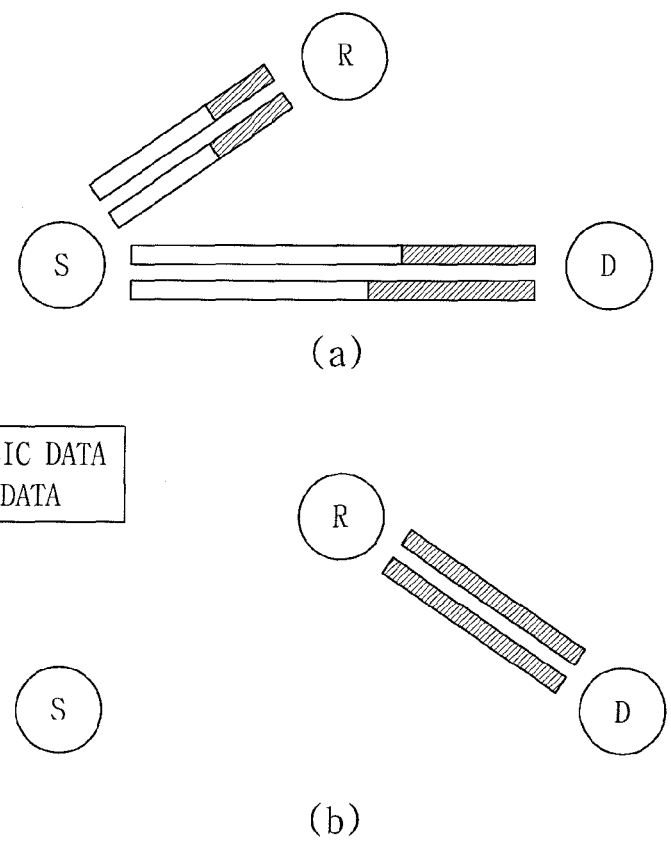
FIG. 7 is a view illustrating sequential steps of the partial information relaying method using PASC.

FIG. 7 illustrates sequential steps of the partial information relaying using the PASO.

FIG. 7A shows a first transmission phase. Assuming that two transmit antennas are present, the source node broadcasts two data streams as expressed by Formula 3.

$\sqrt{1-\alpha_1}x_{b,1}+\sqrt{\alpha_1}x_{s,1}$: First data stream $\sqrt{1-\alpha_2}x_{b,2}+\sqrt{\alpha_2}x_{s,2}$: Second data stream     Formula 3

In Formula 3, $\alpha_i$ denotes the power division factor of basic data $x_{b,i}$ and SC data $x_{s,i}$ of $i^{th}$ stream. In the first transmission phase, the relay node, which has received a signal from the source node, may decode the basic data and then decode the SC data. Also, the destination node may store the signal received from the source node in a memory.

FIG. 7B shows a second transmission phase. In the second transmission phase, the relay node may re-encode successfully decoded SC data $x_{s,1}$ and $x_{s,2}$ in the signal received from the source node so as to forward to the destination node. The destination node may then estimate the received SC data streams $x_{s,1}$ and $x_{s,2}$ using MMSE-SIC and decode the data streams. Afterwards, the destination node may perform SIC, based on the decoded $x_{s,1}$ and $x_{s,2}$, to decode the data streams $x_{b,1}$ and $x_{b,2}$ received from the source node in the first transmission phase.

Figures 8, 9:
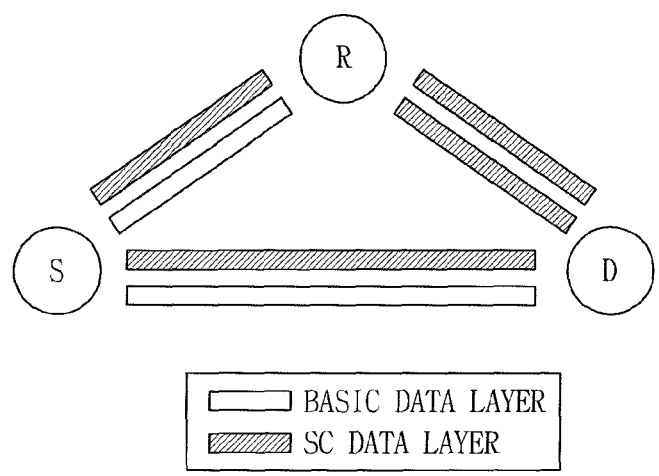
FIG. 8 is a view illustrating a method for performing a Multi-Layer Superposition Coding (MLSC) for M transmit antennas.
FIG. 9 is a view illustrating a method for transmitting multiple data streams using the MLSC.

FIG. 8 illustrates a method for performing a Multi-Layer Superposition Coding (MLSC) for M transmit antennas.

As illustrated in FIG. 8, the basic data and the SC data are transmitted by forming data streams independently for each antenna.

FIG. 9 illustrates a method for transmitting multiple data streams using the MLSC.

In a multiple parallel transmission for a plurality of data streams through Multi-Layer Superposition Coding (MLSC), important is the fact of deciding a SC data stream subset to be partially transmitted by the relay ode. That is, an adaptive parameter L should be decided to maximize the overall rate capacity.

Preferably, the optimization of the adaptive parameter L may be determined based on Signal to Interference Noise Ratio (SINR) per antenna after a proper decorrelation process, such as MMSE-SIC algorithm, in order to minimize the interference between data streams by considering the asymmetric channel condition between the direct link and the relay link.

FIG. 9 illustrates a partial data stream transmission through the MLSC when M=2 (M: transmit antenna) and L=1 (L: adaptive parameter).

Figure 10:
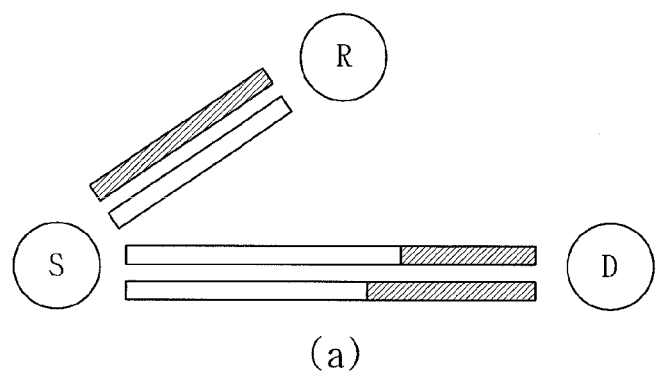
FIG. 10 is a view illustrating sequential steps of a partial information relaying method using the MLSC.
Figure 10:
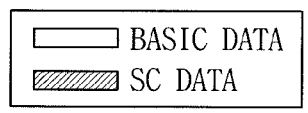
Figure 10:
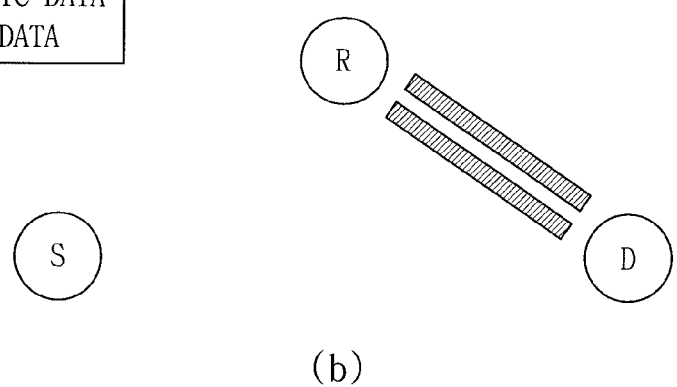

FIG. 10 illustrates sequential steps of the partial information relaying using the MLSC, namely, shows a case of M=2 and L=1.

FIG. 10A shows a first transmission phase. The source node may select a value of L to maximize the entire rate capacity and broadcast two data streams, namely, basic data $x_{b,1}$ and SC data $x_{s,1}$. After reception of such data, the relay node may decode only the SC data stream $x_s$ using MMSE-SIC and the like. Also, the destination node may store the signal received from the source node in the memory.

FIG. 10B shows a second transmission phase. The relay node may re-encode the SC data $x_s$ in the signal received from the source node in the first transmission phase so as to forward to the destination node using all the antennas. The destination node may estimate the received SC data stream $x_s$ using MMSE-SIC so as to decode the SC data stream $x_s$. Afterwards, the destination node may perform the SIC, based on the decoded $x_s$, to decode a data stream $x_b$ received from the source node in the first transmission phase.

Hereinafter, description will be given of optimizing the power division factor $\alpha_m$ and the adaptive parameter L to maximize the overall rate capacity upon transmission of multiple data streams using the PASO and MLSC.

The power division factor $\alpha_m$ with respect to the $m^{th}$ data stream for partial information relaying using the PASO may be determined by the following Formula 4, under assumption that the per-antenna SINR of the direct link between the source node and the destination node is $\gamma_{0,m}$ (m=1, 2, ..., M) and per-antenna SINR of the relay link between the source node and the relay node is $\gamma_{1,m}$ (m=1, 2, ..., M).

$$\alpha_m = \text{MAX}\left(0, \frac{1}{\gamma_{0,m}} - \frac{1}{\gamma_{1,m}}\right) \quad \text{Formula 4}$$

Also, allocated power Pm for each antenna may be determined by a water-filling algorithm, as expressed in the following Formula.

$$\frac{P_m}{P} = \text{MAX}\left(0, \frac{1}{\lambda} - \frac{1}{\lambda_{1,m}}\right) \quad \text{Formula 5}$$

In the above Formula, $\lambda$ denotes the per-antenna SINR of the relay link between the source node and the relay node for transmission of the $m^{th}$ data stream if the total power P is allocated to the $m^{th}$ data stream. $\lambda_{1,m}$ denotes a per-antenna SINR for transmission of the mth data stream if the power $P_m$ is allocated to the $m^{th}$ data stream. Also, $\lambda$ may be determined to meet the total power constraint ($\Sigma_m P_m \leq J$).

Similarly, assuming that the per-antenna SINR of the direct link between the source node and the destination node is $\gamma_{0,m}$ (m=1, 2, ..., M) and the per-antenna SINR of the relay link between the source node and the relay node is $\gamma_{1,m}$ (m=1, 2, ..., M), an optimized adaptation parameter L for the partial relaying via the MLSC may be set by Formula 6.

$$L = \sum_{m=1}^{M} u(\gamma_{1,m} - \gamma_{0,m}) \quad \text{Formula 6}$$

$u(x)=1$ if $x>\delta$, $u(x)=0$ otherwise

Meanwhile, a transmitting side may transmit data by forming optimal transmission beams based on a precoding for optimization of the rate capacity in the system. However, as described above, in the related art relay communication environment, the precoding scheme was designed according to S-R link between source and relay and R-D link between relay and destination without considering the affection of the direct link (S-D link) between source and destination, which may cause a problem of impossible use of information received at the destination node D via the S-D link in the first transmission phase.

Hence, in order to more effectively use information that the destination node D received via the S-D link in the first transmission phase, a precoding scheme considering even the S-D link should be designed. Hereinafter, description will be given in detail of a precoding for maximization of the rate capacity in the system.

Partial information relaying methods employing the precoding proposed in this specification may be divided into Per Antenna Superposition Coding (PASC) and Multi-Layer Superposition Coding (MLSC) according to a way to classify partial information which is to be forwarded at the relay node.

Figure 11:
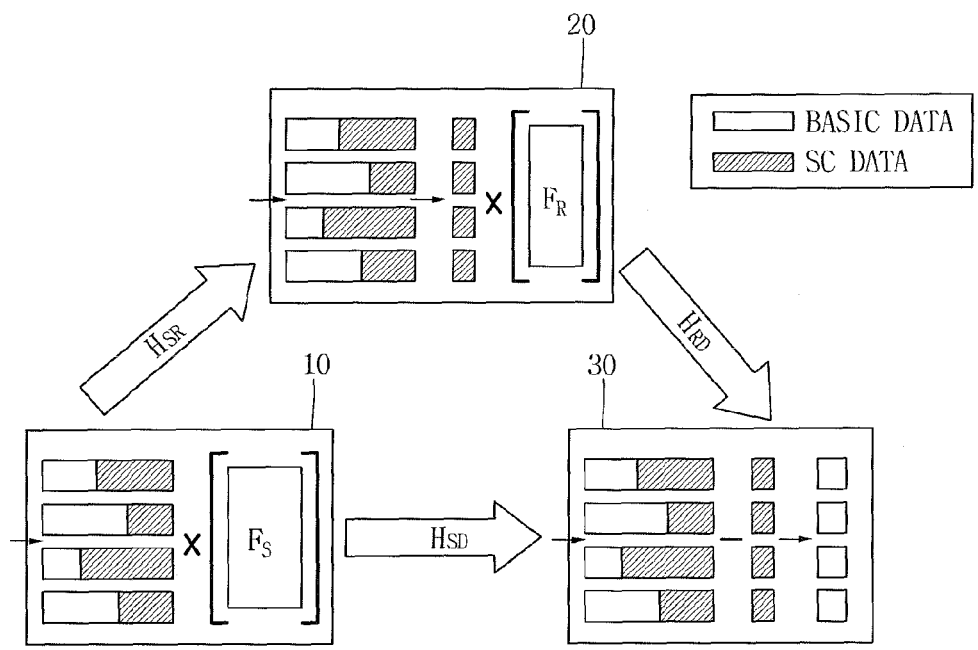
FIG. 11 is a view schematically illustrating a partial information relaying process using the PASC when a precoding has been executed.

FIG. 11 schematically illustrates a partial information relay process using the PASC the precoding has been performed.

The PASC scheme may be configured to encode basic data and SC data for each transmit antenna based on a superposition coding. The encoded information may be transmitted to the relay node 20 and the destination node 30 after multiplying a precoding matrix Fs.

The relay node 20 may decode the basic data. The relay node 20 may then subtract the basic data from the overall received signal using the SIC so as to decode the SC data.

The relay node 20 may forward the decoded SC data to the destination node 30 after multiplying a relay precoding matrix $F_R$. The relay precoding matrix may be designed as a precoding matrix for maximizing the rate capacity via the R-D link.

The destination node 30 may recover the basic data by subtracting the SC data forwarded in the second transmission phase from the signal received in the first transmission phase, using the SIC.

For example, when the source node 10 transmits basic data and SC data by encoding them based on the superposition coding, power allocated to each data and a direction of a precoding matrix should be determined, and a portion corresponding to the sum of the power allocation and the precoding matrix may be an available precoding matrix. Especially, for data transmission via the PASC, the power allocation for the basic data and the SC data may be designed to be different from each other, and the precoding matrix may be determined such that the basic data and the SC data have the same precoding direction.

Assuming that the precoding matrix of the source is $F_s$ and each of $A_b$ and $A_s$ is a matrix indicating the power allocation rate between basic data and SC data, if available precoding matrices of the basic data and the SC data are $Q_b = F_S A_b$ and $Q_s = F_S A_s$, and the rate capacities of the basic data and the SC data are Rb and RS, the rate capacity finally received at the destination node may be given by the following Formula 7.

$$R_b + R_s = \max_{Q_b, Q_s} \{\min(R_1, R_2)\} \quad \text{Formula 7}$$

In Formula 7, $R_1$ and $R_2$ may be defined by the following Formula 8.

$$R_1 = \frac{\log_2|N_0 I + H_{SR} Q_b Q_b^H H_{SR}^H + H_{SR} Q_S Q_S^H H_{SR}^H|}{1 + \frac{1}{R_S^{RD}} \log_2|N_0 I + H_{SR} Q_S Q_S^H H_{SR}^H|}$$

$$R_2 = R_S^{RD} \left[ 1 + \frac{\log_2|N_0 I + H_{SD} Q_b Q_b^H H_{SD}^H| - R_S^{RD}}{\log_2|N_0 I + H_{SR} Q_S Q_S^H H_{SR}^H| - R_S^{RD}} \right] \quad \text{Formula 8}$$

In Formula 8, $N_o$ denotes a power spectral density of noise increased at the relay node and the destination node, and I denotes an identity matrix. $R_S^{RD}$ denotes an information amount (rate) of SC data to be acquirable via the R-D link in the second transmission phase.

In Formula 7, in order to maximize the rate capacity, a smaller value of $R_1$ and $R_2$ should be maximized. The precoding proposed in this specification is to find an optimal precoding scheme by selecting precoding matrices maximizing $R_1$ and $R_2$ and linearly combining the selected matrices.

In Formula 8, $R_1$ denotes an increasing function with respect to $Q_b$ and contrarily a form of a decreasing function with respect to $Q_s$. Therefore, precoding matrices $Q_{b,1}$ and $Q_{S,1}$ for maximizing $R_1$ may be given by the following Formula 9.

$$Q_{b,1} = V_{SR} \Omega_b$$

$$Q_{S,1} = V_{SR} \Omega_{S,1} \quad \text{Formula 9}$$

In Formula 9, if $V_{SR}$ is the right singular matrix of a channel $H_{SR}$, $P_S$ is the transmission power of the source node, and Tr(x) is a trace operation for obtaining the sum of diagonal components of a matrix x, $\Omega_b$ denotes a power allocation matrix which is obtained through a waterfilling solution with a power constraint of $\text{Tr}(\Omega_B \Omega_b^H) \leq (1-\beta) P_S$, and $\Omega_{S,1}$ denotes a power allocation matrix for allocating the overall power to the smallest singular vector with a power constraint of $\text{Tr}(\Omega_{S,1} \Omega_{S,1}^H) \leq \beta P_S$. That is, the precoding matrix $\Omega_{b,1}$ is designed to allocate a beam direction and power to maximize the data rate for the basic data at the S-R link. On the contrary, the precoding matrix $\Omega_{S,1}$ is designed to minimize the data rate for the data at the S-R link to maximize the information amount of the basic data achievable at the relay node.

On the other hand, in Formula 8, an optimal precoding matrix for $R_2$ may depend on a mark of a numerator. However, since the state of the R-D link is better than the state of the S-D link under the typical relay environment, the numerator always has a negative component. Here, $R_2$ has a form of an increasing function for $Q_b$ and $Q_s$. Also, as aforementioned, since there is the constraint that the beam directions of $Q_b$ and $Q_s$ should be the same, the optimal precoding matrices $Q_{b,2}$ and $Q_{s,2}$ can be given by the following Formula 10.

$$Q_{b,2} = V_{SR} \Omega_b$$

$$Q_{S,2} = V_{SR} \Omega_{S,2} \quad \text{Formula 10}$$

In Formula 10, $\Omega_{S,2}$ denotes a power allocation matrix obtained through the waterfilling solution under a power constraint of $\text{Tr}(\Omega_{S,2} \Omega_{S,2}^H) \leq \beta P_S$. The precoding matrix $\Omega_{b,2}$ may be fixed to the S-R link due to the constraint of the direction of the precoding matrix, and the precoding matrix $\Omega_{S,2}$ may be set to the direction of the S-R link so as to maximize information amount of the basic data achievable at the relay node.

According to the above result, because $R_1$ and $R_2$ are the same, the precoding matrix for the basic data may be determined by the following Formula 11.

$$Q_b = V_{SR} \Omega_b, \quad \text{Tr}(\Omega_b \Omega_b^H) \leq (1-\beta) P_S \quad \text{Formula 11}$$

On the contrary, the precoding matrix $Q_s$ for the SC data may have two cases of power allocation in which $R_1$ and $R_2$ are different from each other. The first case may design the precoding matrix to be minimized with respect to the S-R link so as to maximize the information amount of the basic data which is achievable at the relay, while the second case may design the precoding matrix to be optimized with respect to the S-R link so as to maximize the information amount of the SC data which is achievable at the relay. Therefore, the optimal power allocation may be found through the linear combination of the two cases. For finding an optimal combination, $Q_s$ may be represented by the linear combination as given by the following Formula 12.

$$Q_S = (\alpha \Omega_{S,1} \Omega_{S,1}^H + (1-\alpha) \Omega_{S,2} \Omega_{S,2}^H)^{1/2}$$

$$\text{Tr}(\Omega_{S,1} \Omega_{S,1}^H) \leq \beta P_S, \quad \text{Tr}(\Omega_{S,2} \Omega_{S,2}^H) \leq \beta P_S \quad \text{Formula 12}$$

As given by Formula 12, when increasing α value of the precoding matrix $Q_S$ with respect to the basic data, the information amount in terms of $R_1$ may increase and the information amount in terms of $R_2$ may decrease. On the contrary, when decreasing the α value, the information amount in terms of $R_1$ may decrease and the information amount in terms of $R_2$ may increase. According to this principle, the larger value of $R_1$ and $R_2$ may decrease and the smaller value may increase with changing the α value from 0 to 1, thereby maximizing min{$R_1$,$R_2$}. Also, the optimal power allocated to the basic data and the SC data may be determined with changing a β value from 0 to 1. That is, in the precoding matrix determined in form of a linear combination, α* and β*, which allow for determination of the optimal precoding matrix meeting the following with changing the value of α and β from 0 to 1, may be determined by the following Formula 13.

$$\{\alpha^*, \beta^*\} = \underset{\alpha,\beta}{\mathrm{argmin}} |R_1 - R_2| \quad \text{Formula 13}$$

Figure 12:
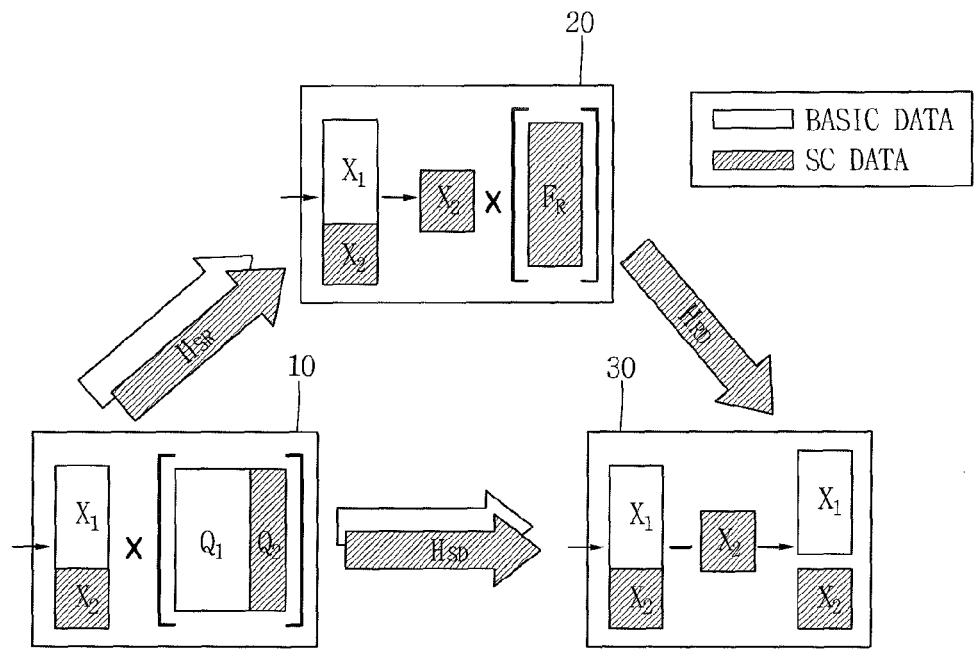
FIG. 12 is a view schematically illustrating a partial information relaying process using the MLSC when a precoding has been executed.

FIG. 12 schematically illustrates a partial information relaying process using the MLSC when the precoding has been performed.

Multi-Layer Superposition Coding (MLSC) is a scheme for transmitting partial information by adjusting the number of information streams which the relay node 20 forwards. First, the source node 10 divides information streams into M−J non-forwarding streams $x_1$ that are not to be forwarded by the relay node 20 and J forwarding streams $x_2$ that are be forwarded by the relay node 20 and transmits the divided data streams $x_1$ and $x_2$ after multiplying precoding matrices $Q_1$ and $Q_2$, respectively. The transmitted non-forwarding streams $x_1$ are decoded at the relay node 20 by treating the forwarding streams $x_2$ as interference. Afterwards, the forwarding streams $x_2$ are decoded using the decoded non-forwarding streams $x_1$ using the SIC. The relay node 20 then forwards only the J forwarding streams $x_2$ of the decoded data streams to the destination node 30 after multiplying the relay precoding matrix $F_R$. Here, the relay precoding matrix $F_R$ is designed as a matrix for maximizing the information amount of the R-D link. Finally, the destination node 30 decodes the M−J non-forwarding streams $x_1$ after subtracting the J forwarding streams $x_2$ forwarded from the relay node in the second transmission phase from the signal received from the source node 10 in the first transmission phase, using the SIC.

The MLSC scheme requires to design the source precoding matrices $Q_1$ and $Q_2$ so as to maximize the rate capacity of the system. Unlike the PASC described with reference to FIG. 3, the precoding matrices $Q_1$ and $Q_2$ have the degree of freedom in view of directions.

The maximum information amount achievable upon employing the MLSC may be given by the following Formula 14.

$$R_1 + R_2 = \max_{Q_1, Q_2} \{\min(R_A, R_B)\} \quad \text{Formula 14}$$

$R_A$ and $R_B$ in Formula 14 may be given by the following Formula 15.

$$R_A = \frac{\log_2 |N_0 I + H_{SR} Q_1 Q_1^H H_{SR}^H + H_{SR} Q_2 Q_2^H H_{SR}^H|}{1 + \frac{1}{R_2^{RD}} \log_2 |N_0 I + H_{SR} Q_2 Q_2^H H_{SR}^H|} \quad \text{Formula 15}$$

$$R_B = R_2^{RD} \left[ 1 + \frac{\log_2 |N_0 I + H_{SD} Q_1 Q_1^H H_{SD}^H| - R_2^{RD}}{\log_2 |N_0 I + H_{SR} Q_2 Q_2^H H_{SR}^H| - R_2^{RD}} \right]$$

In Formula 15, $R_2^{RD}$ denotes the information amount of $x_2$ achievable over the R-D link in the second transmission phase.

Similarly, in order to maximize the rate capacity, the smaller value of $R_A$ and $R_B$ should be maximized. According to this method, precoding matrices for maximization of $R_A$ and $R_B$, respectively, are obtained, and a precoding matrix for maximizing the smaller value of the two values is obtained through the linear combination thereof.

First, regarding Formula 15, $R_A$ is an increasing function with respect to $Q_1$ and contrarily a decreasing function with respect to $Q_2$. Hence, the precoding matrices $Q_{1,A}$ and $Q_{2,A}$ for maximizing the $R_A$ may be given by the following Formula 16.

$$Q_{1,A} = V_{SR}(1:M-J)\Omega_{1,A}$$

$$Q_{2,A} = V_{SR}(M-J+1:M)\Omega_{2,A} \quad \text{Formula 16}$$

In Formula 16, $V_{SR}(1:M-J)$ denotes the largest M−J singular vectors of a channel $H_{SR}$, and $V_{SR}(M-J-1:M)$ denotes the smallest J singular vectors of the channel $H_{SR}$. Also, $\Omega_{1,A}$ and $\Omega_{2,A}$ may be obtained through the waterfilling algorithm with power constraints of $$Tr(\Omega_{1,A} \Omega_{1,A}^H) \le \left(1 - \frac{J}{M}\right) P_S \text{ and } Tr(\Omega_{2,A} \Omega_{2,A}^H) \le \frac{J}{M} P_S,$$

respectively. During this process, power allocation for $Q_{1,A}$ and $Q_{2,A}$ may be proportional to the number of streams transmitted for the sake of simplification. That is, $Q_{1,A}$ may be designed to maximize the rate capacity of the non-forwarding streams received at the relay by forwarding the M−J non-forwarding streams in a direction of the largest M−J eigenvectors of the S-R link, and $Q_{2,A}$ may be designed to maximize the rate capacity of the non-forwarding streams decoded by the relay by forwarding the J forwarding streams in the direction of the smallest J eigenvectors of the S-R link.

On the other hand, regarding Formula 15, the optimal precoding matrix for $R_B$ may depend on the mark of a numerator. However, in the typical relay environment, since the rate capacity of the S-D link is smaller than the rate capacity of the R-D link, the mark of the numerator may be considered as negative. Here, $R_B$ is an increasing function with respect to $Q_1$ and also an increasing function with respect to $Q_2$. Hence, the precoding matrices $Q_{1,B}$ and $Q_{2,B}$ for maximization of $R_B$ may be obtained by the following Formula 17.

$$Q_{1,B} = V_{SD}(1:M-J)\Omega_{1,B}$$

$$Q_{2,B} = V_{SR}(1:J)\Omega_{2,B} \quad \text{Formula 17}$$

In Formula 17, $V_{SD}(1:M-J)$ denotes the largest M−J singular vectors of a channel $H_{SD}$, and $V_{SR}(1:J)$ denotes the largest J singular vectors of the channel $H_{SR}$. Also, $\Omega_{1,B}$ and $\Omega_{2,B}$ may be obtained through the waterfilling algorithm with power constraints of $$Tr(\Omega_{1,B}\Omega_{1,B}^H) \le \left(1 - \frac{J}{M}\right)P_S \text{ and } Tr(\Omega_{2,B}\Omega_{2,B}^H) \le \frac{J}{M}P_S,$$

respectively. The precoding matrix $Q_{1,B}$ may be designed to maximize the rate capacity of the non-forwarding data streams received at the destination node 30 by forwarding the M−J non-forwarding data streams in a direction of the largest M−J eigenvectors of the S-D link, and the precoding matrix $Q_{2,B}$ may be designed to maximize the rate capacity of the forwarding data streams received by the relay node 20 by transmitting the J forwarding data streams in a direction of the largest J eigenvectors of the S-R link.

As the linear combination of the precoding matrices optimized with respect to the $R_A$ and $R_B$, the optimal precoding matrix $Q_1$ with respect to the non-forwarding data streams and the optimal precoding matrix $Q_2$ with respect to the forwarding data streams may be set by the following Formulas 18 and 19, respectively.

$$Q_1 = (\alpha Q_{1,A}\Omega_{1,A}^H + (1-\alpha)\Omega_{1,B}\Omega_{1,B}^H)^{1/2}, \quad \text{Formula 18}$$
$$Tr(\Omega_{1,A}\Omega_{1,A}^H) \le \left(1 - \frac{J}{M}\right)P_S,$$
$$Tr(\Omega_{1,B}\Omega_{1,B}^H) \le \left(1 - \frac{J}{M}\right)P_S$$

$$Q_2 = (\alpha Q_{2,A}\Omega_{2,A}^H + (1-\alpha)\Omega_{2,B}\Omega_{2,B}^H)^{1/2}, \quad \text{Formula 19}$$
$$Tr(\Omega_{2,A}\Omega_{2,A}^H) \le \frac{J}{M}P_S, \ Tr(\Omega_{2,A}\Omega_{2,A}^H) \le \frac{J}{M}P_S$$

According to Formulas 18 and 19, when increasing α value, the rate capacity of $R_A$ may increase and the rate capacity of $R_B$ may decrease. On the contrary, when decreasing the α value, the rate capacity of $R_A$ may decrease and the rate capacity of $R_B$ may increase. According to this principle, the larger value of $R_1$ and $R_2$ may decrease and the smaller value may increase with changing the α value from 0 to 1, thereby maximizing $\min\{R_1, R_2\}$. Therefore, α value α*, which determines the optimal precoding matrix meeting the following Formula 20 with changing the α value from 0 to 1, may be determined.

$$\alpha^* = \arg\min_\alpha |R_A - R_B| \quad \text{Formula 20}$$

In order to design the precoding matrix based on the PASO and LMSC schemes proposed in this specification, each channel information relating to the S-R link, S-D link and R-D link is required. In accordance with one exemplary embodiment, an approach to design a precoding matrix at the destination node 30 due to easy collection of each channel information is considered.

If it is assumed that a fixed relay node is used for downlink data transmission and reception, the channel value of the S-R link between the source node and the relay node may remain still without great change regardless of mobility or scheduling of a user equipment as the destination node. The source node periodically broadcasts the channel value of the S-R link to terminals via a downlink channel. Alternatively, in accordance with another exemplary embodiment of this specification, it may be applicable for the relay node to inform the terminals of the channel value of the S-R link.

In this manner, users always has the channel information relating to the S-R link, and a user who is scheduled at the corresponding time can obtain channel information relating to the S-D link and the R-D link through a downlink channel estimation. After collection of the S-R, S-D and R-D channel information, the user calculates $R_1$ and $R_2$ ($R_A$ and $R_B$) based on the channel information, and determines optimal precoding matrices based on the calculated values. During this process, the precoding matrix may have some components of the precoding matrix for the S-R link (merely having S-R link components in case of PASO). Therefore, it is possible to search a codeword within a predetermined area for codeword with respect to the S-R link without searching the entire codebook. The thusly-determined codeword index may be sent to the source node via a feedback link.

Figure 13:
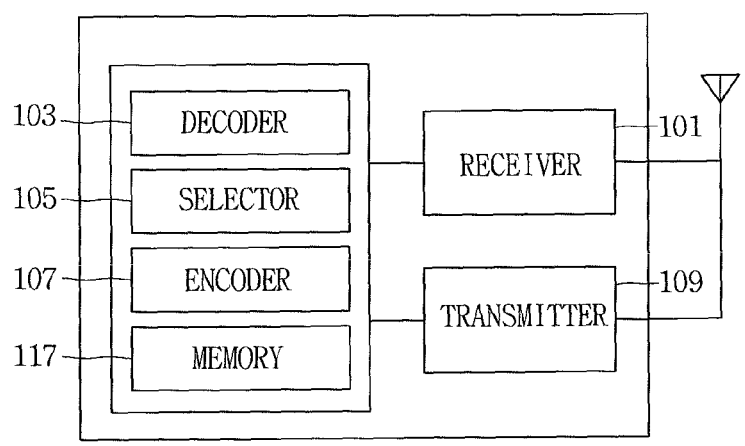
FIG. 13 is a block diagram schematically illustrating a configuration of a relay node in accordance with one exemplary embodiment.

FIG. 13 is a block diagram schematically showing a configuration of a relay node in accordance with one exemplary embodiment.

The relay node may include a receiver 101 to receive a plurality of data streams from a source node after encoding the plurality of data streams based on a superposition coding, a decoder 103 to decode the plurality of data streams received by the receiver 101, a selector 105 to select partial data streams from the successfully decoded data streams by the decoder 103, an encoder 107 to encode the partial data streams selected by the selector 105, a transmitter 109 to transmit the encoded partial data streams to a destination node, and a memory 117 to store the rest of data streams by subtracting the partial data streams forwarded to the destination node from the plurality of data streams received.

Figure 14:
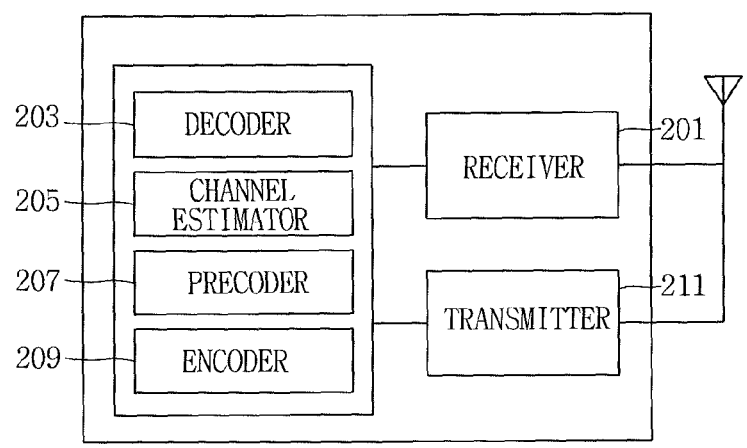
FIG. 14 is a block diagram schematically illustrating a configuration of a destination node in accordance with one exemplary embodiment.

FIG. 14 is a block diagram schematically illustrating a configuration of a destination node in accordance with one exemplary embodiment.

A destination node may include a receiver 201 to receive channel information between a source node and a relay node from the source node, a decoder 203, a channel estimator 205 to estimate channel information between the source node and the destination node and a channel state between the relay node and the destination node, a precoder 207 to calculate a transmission rate of first and second data based on the channel information obtained by the channel estimator 205 to determine an optimal precoding matrix, an encoder 209, and a transmitter 211 to feedback the determined optimal precoding matrix to the source node.

The destination node may receive channel information relating to S-R link, S-D link and R-D link from the source node or relay node or obtain the same through the channel estimation, so as to design the optimal precoding matrices transmittable by the aforementioned PASO or MLSC scheme. The destination node may feedback the designed precoding matrix components to the source node such that the source node can transmit a signal by forming an optimal break pattern. A detailed precoding matrix designing method has already been described, so detailed description thereof will be omitted.

Also, the destination node may be a terminal for downlink data transmission and reception, and a base station for uplink data transmission and reception.

Figure 15:
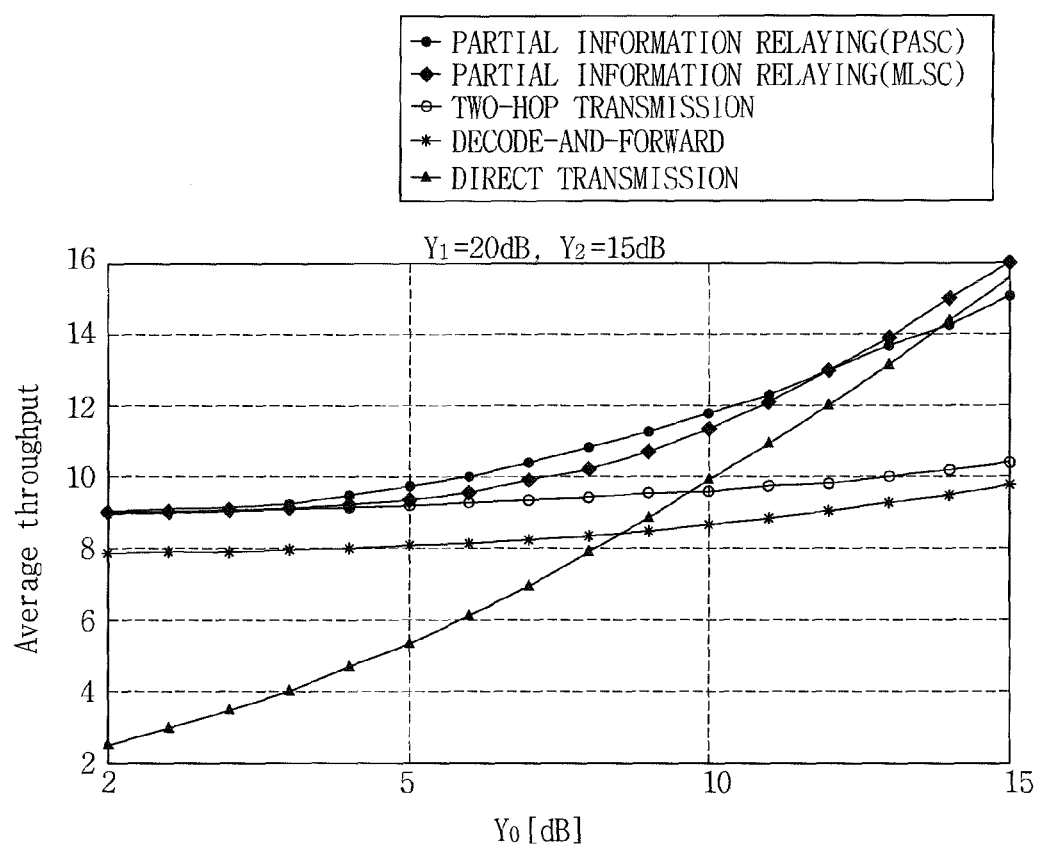
FIG. 15 is a graph showing comparison results of data rate capacities between a partial information relaying method according to this specification and a related art relaying method.

FIG. 15 is a graph showing comparison results of data rate capacities between a partial information relaying according to this specification and a related art relaying.

FIG. 15 shows simulation results for comparing overall data rate capacities upon applying a partial information relaying using PASO and a partial information relaying using MLSC. FIG. 15 shows the performance results obtained by comparing an average rate capacity through the partial information relaying proposed in this specification, an average rate capacity through the related art relay protocol and an average rate capacity only through a direct link in response to changes in SNR $\gamma_0$, under assumption that the number of antennas is 4 (M=4), the SNR of a relay link is 20 dB ($\gamma_1$=20 dB) and SNR of an access link is 15 dB ($\gamma_2$=15 dB). It can be noted that the higher performance is exhibited when the proposed partial information relaying is applied in case of a bad channel state of the direct link. It can also be noticed that the performance improvement is exhibited when applying the proposed method even in case where the channel state of the direct link becomes better, but the performance remains still regardless of the channel state of the direct link when applying the related art relaying method.

The method according to the present disclosure, as described so far, can be implemented by hardware or software, or any combination thereof. For example, the method according to the present disclosure may be stored in a storage medium (e.g., an internal memory of a mobile terminal, a flesh memory, a hard disc, etc.). Alternatively, the method according to the present disclosure can be implemented as codes or command words within a software program capable of being executed by a processor (e.g., a microprocessor within a mobile terminal).

The present invention has been explained with reference to the embodiments which are merely exemplary. It will be apparent to those skilled in the art that various modifications and equivalent other embodiments can be made in the present invention without departing from the spirit or scope of the invention. Also, it will be understood that the present invention can be implemented by selectively combining the aforementioned embodiment(s) entirely or partially. Thus, it is intended that the present invention cover modifications and variations of this invention provided they come within the scope of the appended claims and their equivalents.

The invention claimed is:

1. A multiple data stream transmission method in a relay system including a relay node, the method comprising:
   receiving, by the relay node, a plurality of data streams from a source node;
   decoding, by the relay node, the received plurality of data streams;
   selecting, by the relay node, a portion of the data streams which have been decoded successfully;
   encoding, by the relay node, the selected portion of the data streams by using multi-layer superposition coding; and
   transmitting, by the relay node, the encoded portion of the data streams to a destination node in a collaborative transmission phase,
   wherein the multi-layer superposition coding is performed according to a number of transmit antennas and an adaptive parameter L, and
   wherein the adaptive parameter L is set by the following equation A:

$$L = \sum_{m=1}^{M} u(\gamma_{1,m} - \gamma_{0,m}) \quad \text{(equation A)}$$

where $\gamma_{0,m}$ (m=1, 2, ..., M) is a per-antenna signal-to-interference-plus-noise ratio (SINR) of a direct link between the source node and the destination node, where $\gamma_{1,m}$ (m=1, 2, ..., M) is a per-antenna SINR of a relay link between the source node and the relay node, and
where u(x)=1 if x>δ, and u(x)=0 otherwise.

2. The method of claim 1, further comprising storing the rest of the data streams other than the portion of the data streams sent to the destination node out of the plurality of the data streams received.

3. The method of claim 1, wherein the decoding the received plurality of data streams comprises sequentially decoding the received plurality of data streams from a data stream having a lowest data rate using a Successive Interference Cancellation (SIC).

4. The method of claim 1, wherein the receiving the plurality of data streams from the source node comprises receiving selection information relating to the portion of data stream to be sent to the destination node.

5. The method of claim 1, wherein the decoding the plurality of data streams further comprises:
   sending, to the source node, an ACK/NACK message indicating success or non-success of the decoding; and
   receiving, from the source node, selection information relating to the portion of data streams to be sent to the destination node.

6. The method of claim 1, wherein the destination node, which has received the portion of data streams, decodes the portion of data streams, and then decodes all the data streams received from the source node based on the decoded portion of data streams using the SIC.

7. A multiple data stream transmission apparatus in a relay system, the apparatus comprising:
   a receiver to receive a plurality of data streams from a source node;
   a decoder to decode the plurality of data streams received by the receiver;
   a selector to select a portion of the data streams out of the data streams successfully decoded by the decoder;
   an encoder to encode the selected portion of the data streams by using multi-layer superposition coding; and
   a transmitter to transmit the encoded portion of the data streams to a destination node in a collaborative transmission phase,
   wherein the multi-layer superposition coding is performed according to a number of transmit antennas and an adaptive parameter L, and
   wherein the adaptive parameter L is set by the following equation A:

$$L = \sum_{m=1}^{M} u(\gamma_{1,m} - \gamma_{0,m}) \quad \text{(equation A)}$$

where, $\gamma_{0,m}$ (m=1, 2, ..., M) is a per-antenna signal-to-interference-plus-noise ratio (SINR) of a direct link between the source node and the destination node, and
where $\gamma_{1,m}$ (m=1, 2, ..., M) is a per-antenna SINR of a relay link between the source node and a relay node, and
where u(x)=1 if x>δ, and u(x)=0 otherwise.

* * * * *